(12) United States Patent
Michel et al.

(10) Patent No.: US 11,514,211 B2
(45) Date of Patent: Nov. 29, 2022

(54) METHOD AND SYSTEM FOR PERFORMING A SIMULATION OF A RETRACTION CABLE MOTION

(71) Applicant: SIEMENS INDUSTRY SOFTWARE INC., Plano, TX (US)

(72) Inventors: Benoit Michel, Toulouse (FR);
Guillaume Ginioux, Toulouse (FR);
Pierre Lagier, Tournefeuille (FR)

(73) Assignee: Siemens Industry Software Inc, Plano, TX (US)

(*) Notice: Subject to any disclaimer, the term of this patent is extended or adjusted under 35 U.S.C. 154(b) by 176 days.

(21) Appl. No.: 16/971,390

(22) PCT Filed: Feb. 20, 2018

(86) PCT No.: PCT/IB2018/000135
§ 371 (c)(1),
(2) Date: Aug. 20, 2020

(87) PCT Pub. No.: WO2019/162715
PCT Pub. Date: Aug. 29, 2019

(65) Prior Publication Data
US 2021/0056245 A1   Feb. 25, 2021

(51) Int. Cl.
*G06F 30/20* (2020.01)
*G06F 111/04* (2020.01)
*G06F 111/10* (2020.01)

(52) U.S. Cl.
CPC .......... *G06F 30/20* (2020.01); *G06F 2111/04* (2020.01); *G06F 2111/10* (2020.01)

(58) Field of Classification Search
CPC .. G06F 30/20; G06F 2111/04; G06F 2111/10; G06F 2113/10; G06F 2113/16;
(Continued)

(56) References Cited

U.S. PATENT DOCUMENTS

2017/0124230 A1   5/2017 Liu et al.

OTHER PUBLICATIONS

Hergenrother (Hergenröther, Elke and Patrick Dähne. "Real-Time Virtual Cables Based on Kinematic Simulation." WSCG (2000), pp. 1-8) (Year: 2000).*

(Continued)

*Primary Examiner* — Rehana Perveen
*Assistant Examiner* — Troy A Maust
(74) *Attorney, Agent, or Firm* — Laurence A. Greenberg; Werner H. Stemer; Ralph E. Locher

(57) ABSTRACT

Systems and a method for simulating a flexible retraction cable during motion of an object to which the cable is attached. The method includes receiving information inputs, including a numerical model of the object, receiving cable information inputs and retraction system information inputs. A numerical model of the flexible cable is modeled by modelling only a part of the flexible cable located outside a retraction system as a sequence of control points distributed along a length of the part, wherein each of the control points is submitted to a force representing the interaction of the control point with its environment and wherein the number of control points is fixed. The method further includes storing the numerical model of the flexible cable in a memory and simulating a motion of the flexible cable that would occur during a movement of the object.

15 Claims, 4 Drawing Sheets

(58) Field of Classification Search
CPC .......... G06F 30/23; G06F 30/25; G06F 30/27; G06F 30/28; G06F 2111/00–2119/22; B65H 75/362; G06T 17/00; G06T 17/10
USPC .......................................................... 703/13
See application file for complete search history.

(56) References Cited

OTHER PUBLICATIONS

Wang, Haitao et al: "Dynamic modeling of a hose-drogue aerial refueling system and integral sliding mode backstepping control for the hose whipping phenomenon", Chinese Journal of Aeronautics, vol. 27, No. 4, pp. 930-946, XP055832415, ISSN: 1000-9361, DOI: 10.1016/j.cja.2014.06.010 / Aug. 1, 2014.

Jingli, Du et al: "Dynamic analysis of cable-driven parallel manipulators with time-varying cable lengths", Finite Elements in Analysis and Design, Elsevier, Amsterdam, vol. 48, No. 1, pp. 1392-1399, XP028319358, ISSN: 0168-874X, DOI: 10.1016/J.FINEL.2011.08.012 / Aug. 18 201.

Muttin, Frédéric: "Umbilical deployment modeling for tethered UAV detecting oil pollution from ship", Applied Ocean Researc, Elsevier, Amsterdam, vol. 33, No. 4, pp. 332-343, XP028293457, ISSN: 0141-1187, DOI: 10.1016/J.APOR.2011.06.004 / Jun. 29, 2011.

Gonzalez F. et al.: "Real-time simulation of cable pay-out and reel-in with towed fishing gears"; Ocean Engineering 131; pp. 295-307 [online], [retrieved on Apr. 30, 2018], Retrieved from internet: https://www.sciencedirect.com/science/article/pii/S002980181730001 X; DOI: 10.1016/j.oceaneng. 2017.01.002. 2017.

Tang A. et al.: "Dynamics modeling and simulating analysis of a Wire Driven Parallel Mechanism"; Proceedia Engineering 15 (2011); pp. 788-794 [online], [retrieved on Apr. 29, 2018]; retrieved from Internet: <URL: https://www.sciencedirect.com/science/article/.

* cited by examiner

METHOD AND SYSTEM FOR PERFORMING A SIMULATION OF A RETRACTION CABLE MOTION

TECHNICAL FIELD

The present disclosure is directed, in general, to computer-aided design, visualization, and manufacturing ("CAD") systems, product lifecycle management ("PLM") systems, product data management ("PDM") systems, and similar systems, that manage data for products and other items (collectively, "Product Data Management" systems or PDM systems). More specifically, the disclosure is directed to production environment simulation.

BACKGROUND OF THE DISCLOSURE

In the planning of industrial processes, computer simulation techniques are used where a physical scene of a physical environment is modeled by a virtual scene of a virtual simulation environment. The physical or real scene may, for example, be a facility, a manufacturing plant, an industrial scene, or any other physical scene which may benefit from being modeled in a virtual environment for industrial simulation purposes.

The real scene may include a variety of real objects which are related to a manufacturing plant. Examples of real objects include, but are not limited to, equipment pieces, tools, containers, robots, material pieces, finished or semi-finished products, and other objects present in the real scene. Real objects are represented in the virtual simulation environment by virtual objects. Virtual objects are typically defined through three-dimensional (3D) virtual models, examples of which include, but are not limited to, CAD models, CAD-like models, point cloud models, and other types of 3D computer models.

In the real scene, the real objects are characterized by a position, an orientation, strain and stress, which can change/move as the real object is moving or re-positioned within the real scene. When modeling industrial facilities in the virtual simulation environment, it is often a common requirement that the position, orientation, strain and stress of the virtual objects in the virtual scene accurately reflect the position, orientation strain and stress of the real objects in the real scene.

For instance, robots used for manufacturing processes may have complex motion behaviors that are repeated over time. In particular, flexible robot cables endure variable and repeated stress and strain during motion, including bending and torsion forces, repeated contacts with a surrounding environment, which may lead to cable failure, and consequently manufacturing downtime. Correct simulations of flexible cable behavior over time and under the specific environment of the robot to which it is attached ensure to develop higher quality robot solutions with reduced long-term deployment costs.

Various solutions already enable to simulate flexible cable motion for robots. A typical example is the software Kineo Flexible Cables developed by Siemens PLM software. The existing solutions use physics-based solver for simulating multiple cables of the robot in real-time. Fully-integrated contact and clash detection ensures that cables respect collision-free motion in the virtual environment of the robot. Stress and strain calculations enable to predict cable tension, flexion and torsion, while effects of gravity, cable inertia and geometric non-linearity might be automatically accounted for.

Nevertheless, no solution adequately tackles the problematic of flexible retraction cables.

Flexible retraction cables are cables usually mounted on a robot with some degree of freedom by means of one or several clamping means that fix one or several points or parts of the cable to the robot structure, and that additionally cooperate with a retraction system of the robot whose task is to retract as much as possible of the cable length within a housing of the retraction system during motion of the robot or during motion of a first part of the robot with respect to a second part of the robot. This enables the robot to store some unused length of the cable inside the housing of the retraction system during motion that does not require additional length of the cable. It therefore reduces the amplitude of motion of the flexible retraction cable in its environment, avoiding for instance harmful contacts between the flexible retraction cable and the surrounding environment.

Due to the complexity of the physics related to flexible retraction cable motion cooperating with such a retraction system, no appropriate solution is known at the moment.

It is therefore an objective of the present invention to propose a solution enabling to efficiently simulate a motion of a flexible cable cooperating with a retraction system, wherein the flexible cable and the retraction system are configured for being installed on a robot, wherein computational time and storage required for the simulation are reduced.

SUMMARY OF THE DISCLOSURE

Various disclosed embodiments include methods and corresponding systems and computer readable mediums for simulating a flexible cable cooperating with a retraction system during motion of an object, like a robot, to which the flexible cable and the retraction system are attached. A method includes receiving information inputs including a numerical model of the object. The method further comprises receiving cable information inputs and retraction system information inputs, wherein cable information inputs are data related to the flexible cable and retraction system information inputs are data related to the retraction system, wherein the retraction system and the flexible cable are coupled together and have to be installed on the object, wherein the flexible cable comprises a retracted part (for instance located within a housing of the retraction system) and an external part (for instance located outside of the housing of the retraction system). The method comprises creating a numerical model of the flexible cable by modelling the latter as a sequence of control points distributed along a length of the flexible cable wherein each of the control points is submitted to a force representing the interaction of the control point with its environment, storing the numerical model of the flexible cable in a memory, simulating motion of the flexible cable that would occur during motion of the object by changing a position of at least one control point in function of the time while taking account of a force applied to said control point, wherein only the external part of the flexible cable is modelled as said sequence of control points while the retracted part of the flexible cable is neither modelled nor simulated, wherein the number of control points is fixed, wherein the length of flexible cable measured along the flexible cable length of the external part and separating two neighboring control points varies during the simulation of the motion of the flexible cable in function of a variation of the length of the external part of the flexible cable, wherein the variation of said length is a function of a retraction force modelling the force applied by the retraction system on the flexible cable for retracting the latter, for instance within its housing, and optionally of an external force applied by the external part. In particular, a length of the external part in function of the time might be defined by a user, and typically serves as a constraint for the simulation of the flexible cable. Preferably, said length of flexible cable measured along the external part flexible cable length and separating two neighboring control points is defined as a function of the length of the flexible cable external part. In other words, the distribution of the control points along the length of the flexible cable external part preferentially fixes the length of flexible cable separating two neighboring control points as a proportion of the length of the external part of flexible cable.

In another example, a data processing system is disclosed. Said data processing system comprises a processor and an accessible memory. The data processing system is particularly configured to a) receive object information inputs including a numerical model of an object, wherein said object comprises at least one part that might be in motion, and preferentially at least two parts in relative motion, respectively a first part and a second part, wherein said object information inputs may also comprise motion information regarding said at least one part that might be in motion;

b) receive cable information inputs including a length of a flexible cable, a connection position of a first part of the flexible cable to the object, for instance the first part of the cable might be one of the extremities of the flexible cable that has to be connected to the first part of the object, a connection position of a second part of the flexible cable to retraction means of the retraction system, the first part being different from the second part of the flexible cable, for instance the second part of the flexible cable is the other one of said extremities and has to be connected to the second part of the object via said retraction means, wherein the first part of the flexible cable is typically connected/fixed to the object by clamping means configured for attaching or fixing the flexible cable to the object, wherein the second part of the flexible cable is fixed to the object through the retraction means of the retraction system, wherein each connection position defines a position on the flexible cable with respect to the object;

c) receive retraction system information inputs including a position of an entrance of a retraction system coupled to the flexible cable, optionally a maximal length of flexible cable that might be retracted by the retraction system through said entrance, a direction of retraction of the flexible cable through the entrance, and a retraction force applied by retraction means of the retraction system on the flexible cable for retracting the latter through the entrance, preferentially said retraction force can be indirectly defined by means of a spring constant for the retraction means of the retraction system, wherein the retraction means are typically configured for retracting through said entrance a length of the flexible cable according to the direction of retraction, for example within a housing of the retraction system, and wherein the retraction system is configured for being fixed to the object, wherein the position of the entrance is defined with respect to the object;

d) automatically create a numerical model of the flexible cable from the object information inputs, cable information inputs and retraction system information inputs, wherein the flexible cable is modelled as a sequence of control points distributed only along a length of an external part of the flexible cable, wherein said external part is a part of the flexible cable extending from the entrance position in a direction opposed to the retraction direction until an extremity of the flexible cable, in particular until one of said connection positions of the part the first part or of the second part, wherein each of the control points is submitted to a force representing an interaction of the control point with its environment, wherein the length of the external part of the flexible cable varies in function of a retraction force applied by the retraction means on the flexible cable for retracting the latter and, optionally and additionally, in function of said external force applied by the external part, and wherein the number of control points along said length of the external part is fixed. In particular, the external part is the part of the flexible cable comprised between the entrance position and the first part of the flexible cable;

e) automatically store the numerical model of the flexible cable in a memory;

f) simulate a motion of the flexible cable that would occur during a motion of the object, for instance during motion of the first part of the object, wherein the number of control points of the external part of the flexible cable is kept fixed during the simulation, while the length of said external part may vary. During said motion of the object, at least one control point has a relative motion compared to the other control points. In particular, the simulation of the motion of the flexible cable according to the invention automatically computes the length of the external part in function of the time.

In another example, a non-transitory computer-readable medium is disclosed. The non-transitory computer-readable medium is encoded with executable instructions that, when executed, cause one or more data processing systems to perform the above-mentioned steps a)-f).

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Figure 1:
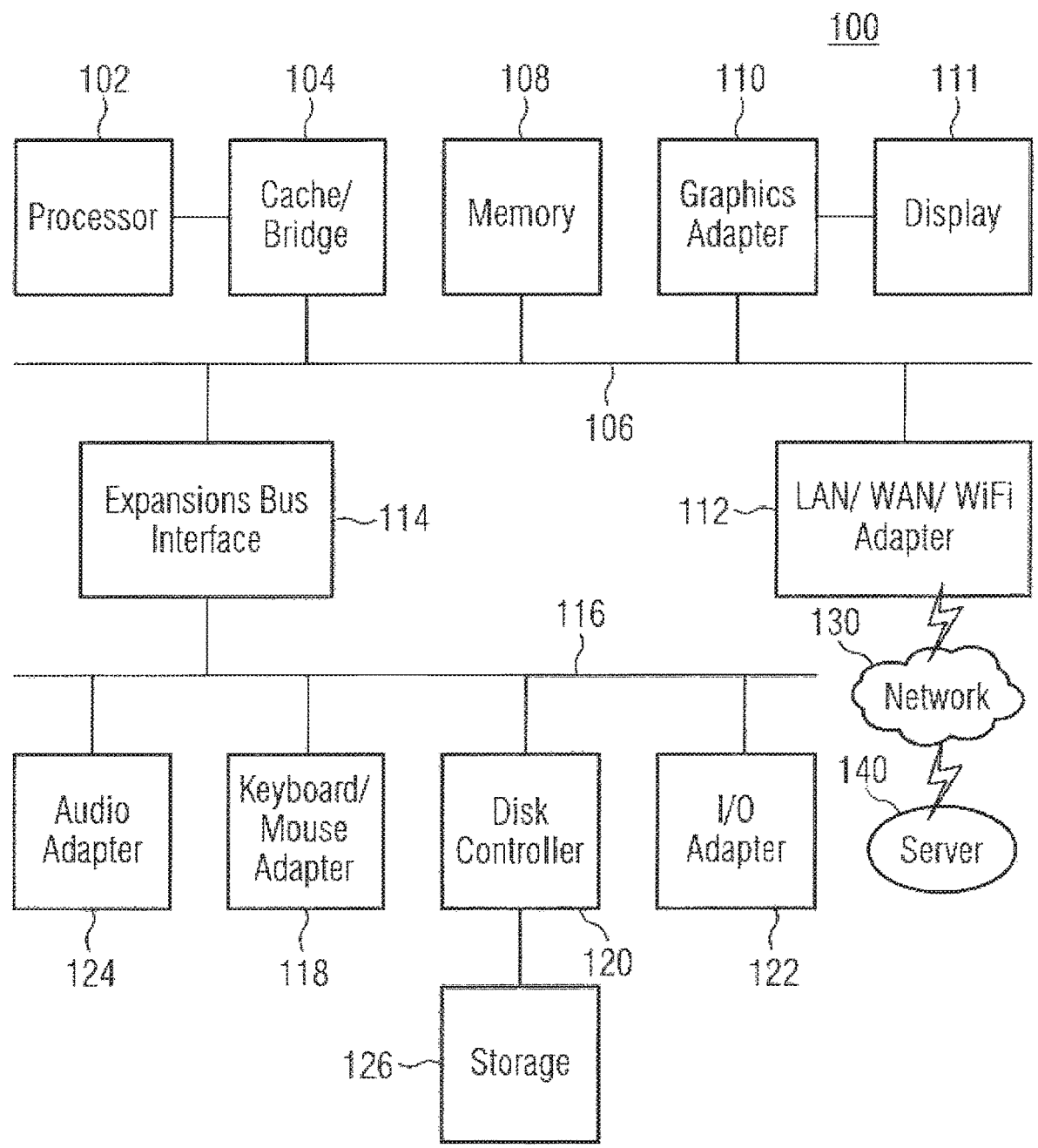
FIG. 1 illustrates a block diagram of a data processing system in which an embodiment can be implemented.

FIG. 1 illustrates a block diagram of a data processing system 100 in which an embodiment can be implemented, for example as a PDM system particularly configured by software or otherwise to perform the processes as described herein, and in particular as each one of a plurality of interconnected and communicating systems as described herein. The data processing system 100 illustrated can include a processor 102 connected to a level two cache/bridge 104, which is connected in turn to a local system bus 106. Local system bus 106 may be, for example, a peripheral component interconnect (PCI) architecture bus. Also connected to local system bus in the illustrated example are a main memory 108 and a graphics adapter 110. The graphics adapter 110 may be connected to display 111.

Other peripherals, such as local area network (LAN)/Wide Area Network/Wireless (e.g. Wi-Fi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware illustrated in FIG. 1 may vary for particular implementations. For example, other peripheral devices, such as an optical disk drive and the like, also may be used in addition or in place of the hardware illustrated. The illustrated example is provided for the purpose of explanation only and is not meant to imply architectural limitations with respect to the present disclosure.

A data processing system in accordance with an embodiment of the present disclosure can include an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Figure 2:
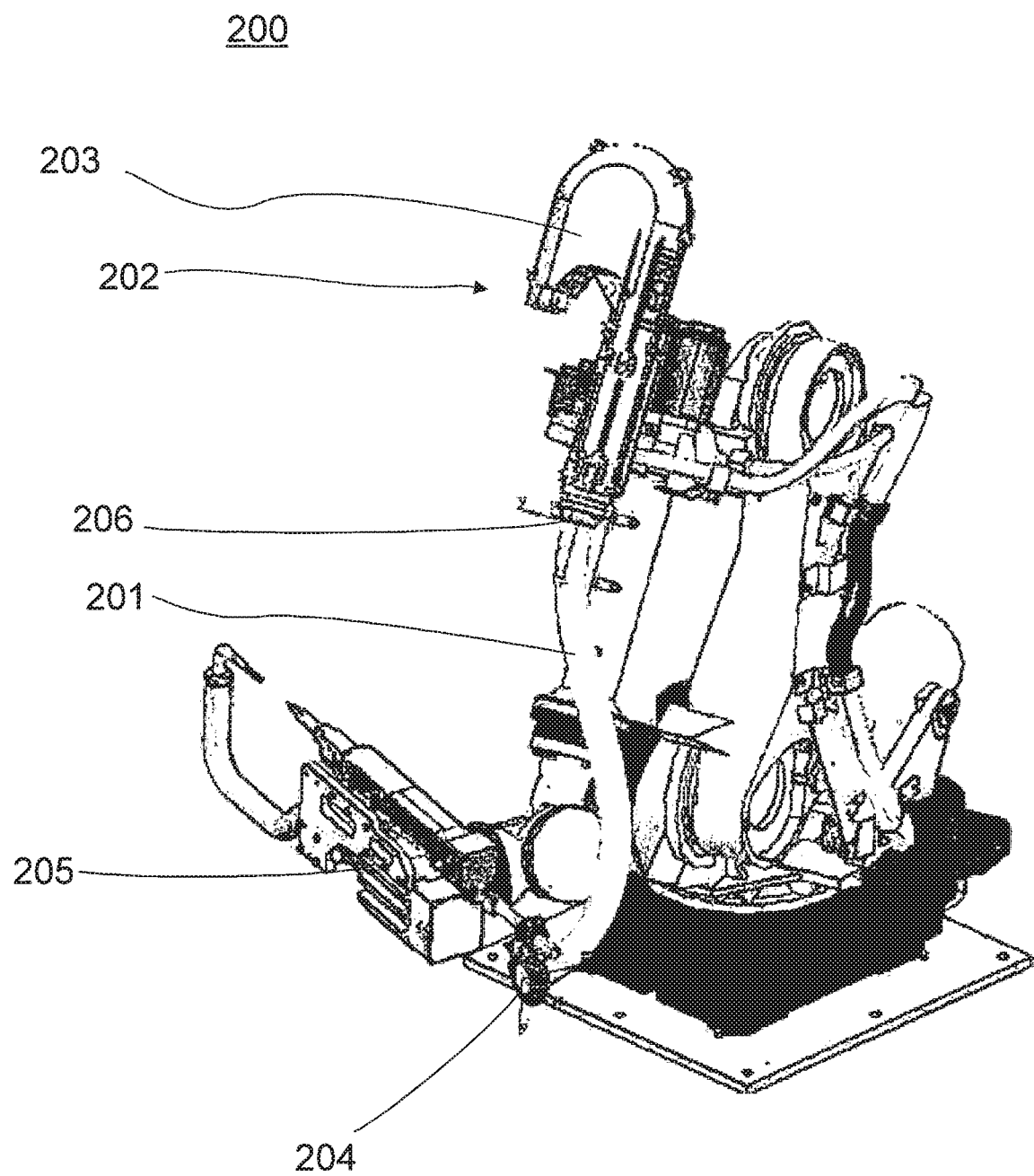
FIG. 2 schematically illustrates a schematic view of a robot comprising a retraction system for retracting a flexible cable.

FIG. 2 illustrates a preferred embodiment of an object to which a flexible cable and a retraction system according to the invention might be attached and for which motion behavior requires to be simulated. According to said preferred embodiment, the object is a robot 200 comprising a flexible cable 201 and a retraction system 202. The retraction system 202 is configured for retracting unused length of the flexible cable 201 within a housing 203 during motion of the robot 200. Indeed, specific motions of the robot may require an additional flexible cable length in which case said additional cable length is obtained by pulling the flexible cable outside of the housing 203 through an aperture or entrance 206 of said housing 203. For other robot motions, said additional length would be an inconvenience, and in this case, the retraction system 202 automatically pulls back, i.e. retracts, said additional length in its housing 203 so that said additional length does not interfere with said other robot motions. Typically, a first part 204 of the flexible cable 201, for instance a first extremity, is fixed to a first connector installed on a first part of the robot 200, for instance the connector of a tool 205 used for accomplishing some manufacturing tasks, and a second part of the flexible cable 201, for instance a second extremity of said flexible cable, is fixed to the robot via retraction means typically installed within the housing 203 of the retraction system 202 which is mounted on another part of the robot 200, wherein the first part and the second part of the robot are in relative motion compared to each other during motion of the robot. In other words, the first part of the robot is moving with respect to the second part of the robot, when for instance the tool 205 is realizing a manufacturing task. Because of this relative motion between the first part and the second part of the flexible cable, the retracted part of the flexible cable that is stored within the housing of the retraction system varies in function of the time (i.e. in function of the manufacturing task realized by the robot), and the retraction system 202 ensures that the length of the flexible cable neither prevent nor disturb the motion of the tool 205.

Figure 3:
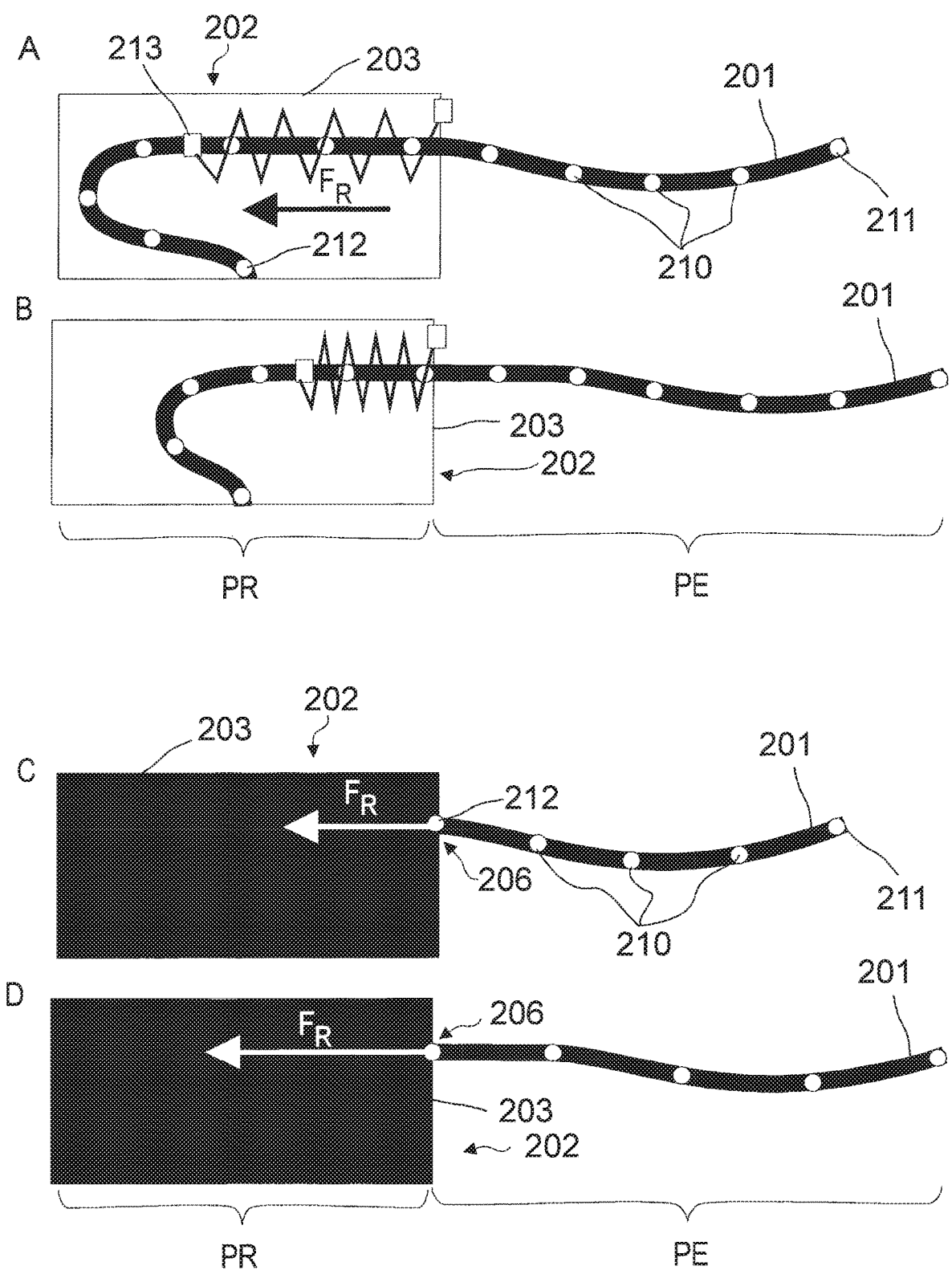
FIGS. 3A and 3B schematically illustrate a straightforward proposed solution for modeling the flexible cable of FIG. 2, and FIGS. 3C and 3D a preferred embodiment of the invention for modeling said flexible cable.

FIG. 3 schematically illustrates two different numerical models for modelling a flexible cable 201 attached to a retraction system 202 comprising a housing 203: a first numerical model of the flexible cable interacting with the retraction system is represented schematically by Figures A and B according to a proposed straightforward solution, and a second numerical model of the same flexible cable is represented in Figures C and D according to a preferred embodiment of the present invention, wherein said second numerical model is automatically created and then simulated by the data processing system according to the invention.

The first numerical model represented in Figures A and B shows a straightforward solution to the technical problem of flexible cables installed on robots, wherein the flexible cable 201 is modelled as a sequence of control points 210 regularly spaced along the whole length of the flexible cable 201. The flexible cable comprises an external part PE located outside of the housing 203 and a retracted part PR located inside the housing 203. The lengths of the external part PE and retracted part PR vary in function of a motion of at least one control points with respect to the other control points. It can be for instance the motion of an extremity of the flexible cable 201 compared to the retraction system coming for instance from a motion of the object to which the flexible cable and retraction system are attached, but it could be also a motion of a control point located between the extremity of the flexible cable located outside the housing and said housing, for instance due to inertia. The positions that might be taken by each control point constitute the degrees of freedom of the flexible cable 201. Said positions of each control point might be defined with respect to the object, for instance with respect to a stationary body of the robot, or with respect to an external frame of reference used for describing the motion of the object. Typically, a first part of the flexible cable 201 comprises a first control point 211 and is typically located at the first extremity of the flexible cable 201 and might correspond to a fixation of said flexible cable to the first connector which can be for instance installed on a first part of the object, and a last control point 212 is located at the other extremity of the flexible cable 201 and corresponds to a fixation of said flexible cable to a second connector, preferentially within the housing 203 of the retraction system, which is typically installed on a second part of the object, wherein the first part of the object and the second part of the object might be in relative motion. Between the first control point 211 and the last control point 212, the numerical model of the flexible cable 201 might comprise one or several control points whose changes of positions in function of the time simulate the motion of the flexible cable 201 during motion of the object.

The degrees of freedom of the control points 210 are submitted to various forces that model internal stress, gravity, and contact forces, depending on their value, and to the effects of inertia. The degrees of freedom are also submitted to constraints on their value that represent avoidance of interpenetration with surrounding rigid objects. The motion of the flexible cable 201 is divided in small time-steps, wherein at each time-step, the value of the degrees of freedom—that is, the position of control points—is recomputed. The new values are recomputed using known techniques that take account of forces that apply to each degree of freedom, effects of inertia, and constraints that prevent interpenetration with other objects.

According to the above-mentioned straight forward solution, the retraction system 202 is typically modelled by a retraction force $F_R$ that is added to the other forces to which the flexible cable 201 is submitted (e.g. internal stress, gravity internal friction, friction with the environment), and additionally, contact forces are applied to the retracted part of the cable that is inside the housing 203 and more importantly to a part of the flexible cable located at the entrance of the housing 203 of the retraction system 202. The retraction system implies that at least a second part 213 of the flexible cable is connected to retraction means of the retraction system wherein the interaction between the retraction means and the flexible cable is represented by the retraction force $F_R$ acting on a control point comprised within said second part 213. According to said straightforward solution, the numerical model of the flexible cable 201 comprises a fixed number of control points 210, but the number of control points 210 that are located outside the housing 203 varies in function of the time, i.e. varies in function of the length of the flexible cable that is located outside the housing 203. For instance, FIG. 3A shows the flexible cable 201 in a retracted position wherein 5 control points are located outside the housing 203 and FIG. 3B shows the flexible cable 201 in a pulled-out position wherein the length of the external part of the flexible cable that is located outside the housing 203 increased, resulting also in an increase of the number of control points 210 located outside the housing and which passed from 5 to 6 control points.

The previously exposed straightforward solution for determining the behavior of a flexible cable suffers from the following disadvantages:

high complexity of the numerical model of the flexible cable that has to be stored in a memory of the data processing system computing said numerical model, which results notably from the retraction system adding constraints to the flexible cable;

high computational effort and time for obtaining a simulation of a motion of the flexible cable.

Therefore, such a solution would not be suitable and efficient enough for simulating motion of a flexible retraction cable, since it would require high computational capacities, long computational time and large storage.

Present embodiments enable to simplify the numerical model of a flexible cable attached to a retraction system, reducing therefore the memory size needed for storing said numerical model, and reducing as well the computational time and effort for obtaining the simulation of a motion of the flexible cable. For instance, the number of calculations for simulating a motion of the flexible cable submitted to an action of the retraction system is far smaller than the number of calculations that would be required for simulating the same motion according to the straightforward solution.

These advantages are illustrated by means of the second numerical model proposed by the present invention according to FIGS. 3C and 3D, wherein the retracted part PR of the flexible cable 201 is not simulated: in other words, the housing 203 is considered as a black box and the behavior of the flexible cable 201 within said black box is not taken into consideration for the purpose of simulation. Only the external part PE of the flexible cable 201, i.e. the part of the flexible cable that is located outside the housing 203, is taken into consideration for the simulation purpose.

Consequently, instead of simulating a flexible cable 201 whose length is constant, the present invention proposes to create a numerical model for the flexible cable 201 that comprises only the external part of the flexible cable with respect to an entrance 206 of the retraction system, wherein the length of said external part is a variable parameter. Indeed, the length of said external part changes in function of the time depending whether the flexible cable 201 is pulled outside of the housing 203 or retracted inside the housing 203. This variable length of the external part of the flexible cable 201 is, according to the present invention, an additional degree of freedom of the numerical model of the flexible cable 201. Additionally, the retraction force $F_R$ applied by the retraction system 202 to the flexible cable 201 is modelled as a spring force acting on said additional degree of freedom that is the variable length. Further, the external part of the flexible cable is still modelled as a sequence of control points 210, but the number of control points 210 located outside the housing 203 does not change with time (i.e. with the pulling or retraction of the cable from/within the housing) contrary to the straightforward solution. Indeed, according to the present invention, only the external part of the flexible cable is modelled by a numerical model, and said numerical model comprises a fixed number of control points distributed along the length of said external part of the flexible cable. As noticeable by comparing FIGS. 3C and 3D, the number of control points 210 located outside the housing 203 remains the same while the length of the external part of the flexible cable 201 increases (or inversely, would decrease). Preferentially, and as already disclosed in the straightforward solution, the control points 210 are still distributed, for instance regularly or irregularly spaced, over the length of the external part of the flexible cable, but now this spacing is applied to the variable length of the external part of the flexible cable. In other words, the distance measured along the cable length between two neighboring control points 210 of the numerical model of the flexible cable according to the invention is varying in function of the length of the external part, and will thus vary over the time in order to follow the motion of the robot. Additionally, the control points 210 are still submitted to forces that model internal stress and/or gravity and/or internal friction and/or friction with the environment and/or other physical phenomena, and they are preferentially also submitted to interpenetration avoidance constraints and inertia effects.

Preferentially, the numerical model of the flexible cable according to the invention comprises also a first control point 211 preferentially located at a first extremity of the external part of the flexible cable 201 that has typically to be fixed to the so-called first connector, and a last control point 212 located at the other extremity of the external part of the flexible cable 201, wherein said last control point 212 remains located at the cable entrance 206 of the housing 203 of the retraction system 202 independently of a variation of the length of the external part. In particular, during variation of the length of the external part PE, the last control point 212 remains at the same location with regard to the cable entrance 206, and the first control point 211 preferentially remains located at the first extremity of the flexible cable. Between the first and the last control points, the numerical model of the flexible cable according to the invention may comprise one or more additional control points, wherein the changes of the control point positions in function of the time simulate the motion of the whole external part of the flexible cable 201 during motion of the object. Typically, at least one of said control points has a relative motion with respect to the other control points during motion of the object. For instance, the last control point 212 might be characterized by a fixed position over time when considering an inertial frame of reference attached to the cable entrance 206 of the housing 203, while the position of the first control point 211 may vary in function of the time with respect to the position of the last control point 212 in order to simulate motion of the external part of the flexible cable. Contrary to the straightforward solution, the data processing system according to the invention is configured to automatically recalculate the position of any control point located between the last control point 212 and the first control point 211 in order to keep for instance an identical control point interdistance measured along the length of the flexible cable between each pair of directly successive control points during a variation of the length of the external part or in order to satisfy a user-defined constraint with regard to the distribution of the positions of the control points along the length of the flexible cable. In other words, said interdistance, i.e. the spacing between two directly successive control points, varies in function of the length of the external part PE: the greater is that length, the greater the interdistance will be, and inversely. Indeed, and preferably, the length of flexible cable separating two neighboring control points is a proportion or percentage of the length of the external part of flexible cable: for instance, if one measures the length of the external part from the last control point 212, then said last control point 212 is at 100% of the length of the external part and the first control point 211 remains at 100% of said external part length, while the latter may vary. The other control points are then distributed between the first control point and the last control point according to fixed proportion/percentage of the external part length. For instance, a second control point might be located at 20% of the external part length, a third control point might be located at 50% of the external part length, etc. Such a distribution of the control points along the length of the external part as a proportion/percentage of the external part length enables the system to easily recalculate the position of the control points in function of a variation of the external part length. The distribution of the control points according to the present invention defines preferentially the length of flexible cable separating two directly successive, i.e. neighboring, control points as a fixed proportion or percentage of the variable external part length.

Known techniques for simulating physical systems, that can be applied to known numerical models of flexible cables as sequence of control points, are then applied mutatis mutandis to the numerical model of the external part PE, wherein the motion of the external part of the flexible cable is divided in small time-steps, wherein at each time-step, the value of all degrees of freedom—that is, the position of each control points and the variable length of the external part—is recomputed. Such known techniques are for instance described in the document entitled *Variational Integrators*, West M. (2004), Dissertation (Ph.D.), California Institute of Technology, or in the document entitled *Discrete Lagrangian mechanics and geometrically exact Cosserat rods*, Jung, Leyendecker, Linn, Ortiz (2009).

The data processing system configured for simulating the flexible cable 201 according to the numerical model proposed by the present invention has numerous advantages compared to data processing system configured for simulating flexible cables according to the straightforward solution. Indeed, since the retraction system is considered as a black box that is not simulated and because only the external part of the flexible cable is simulated with a fixed number of control points, the data processing system memory used for the simulation as well as the computational time required for performing the simulation is drastically reduced. Indeed, the number of data stored by the data processing system for performing the simulation is reduced and the number of calculations for simulating a motion of the flexible cable is also reduced. Additionally, the time needed for creating the numerical model is strongly decreased since one does not account for the interaction between the retraction system and the flexible cable within the housing 203. Indeed, only the retraction force $F_R$ applied by the retraction system on the external part is taken into account.

Figure 4:
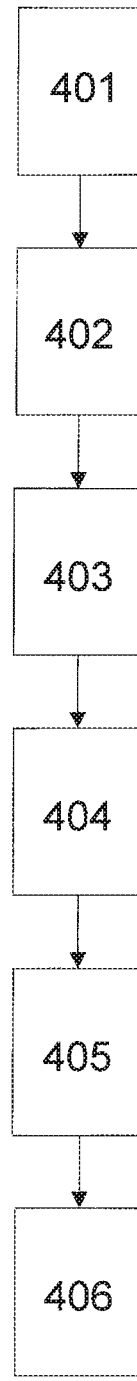
FIG. 4 illustrates a flowchart of a process for simulating a flexible retraction cable.

FIG. 4 illustrates a flowchart 400 of a method for performing a simulation of a flexible cable by a data processing system according to the invention. The flexible cable comprises preferentially at least one part, for instance a first extremity, characterized by a relative motion with regard to another part, for instance a second extremity. The flexible cable according to the invention is coupled to a retraction system. The flexible cable and the retraction system are typically part of a robot whose motion, for instance a repeated predefined motion of some parts of the robot, results in a motion of the flexible cable. Preferentially, one or several parts of the flexible cable are attached to one or several structures or parts of the robot and might be submitted to relative motion. A preferred embodiment of the different steps of the method according to the invention is described in the following.

At step 401, the data processing system receives object information inputs including a numerical model of an object. Said object preferentially comprises at least two parts or structures in relative motion, respectively a first part and a second part. Said object is typically a robot, wherein for instance an arm structure is the first part and a body structure is the second part, wherein the arm structure is in relative motion with respect to the body structure. At this step, the numerical model of the object received by the data processing system is notably free of any data related to the flexible cable and retraction system which have to be simulated by the data processing system according to the invention.

At step 402, the data processing system receives cable information inputs including a length of the flexible cable, a connection position of a first part of the flexible cable to the object, a connection position of a second part of the flexible cable to retraction means of a retraction system configured for being installed on said object. The cable information inputs may comprise optionally other parameters, including at least one of the following parameters or additional information inputs:

one or several additional connections positions of the flexible cable to the first and/or second and/or additional part of the objects;

a diameter of the flexible cable;

a maximum contact force;

a maximum and/or a minimum radius of curvature of the flexible cable;

one or several rigidity/stiffness coefficients of the flexible cable;

a number of control points for simulating the flexible cable;

a deformation limit of the flexible cable, like a maximum twist, maximum twist rate;

a mass, linear mass or volume density of the flexible cable;

parameters defining the distribution of control points along the length of the flexible cable, for instance the distribution of the control points along the length of the external part is a distribution in fixed proportions or percentages of the variable external part length;

one or more internal friction parameters;

a maximum tension of the flexible cable;

a list of one or more flexible material components of the flexible cable, each of these components being defined by information inputs including one or more of the following parameters:

one or more parameters describing the space the component fills inside the flexible cable, for instance an inner and/or outer layer diameter;

one or more rigidity/stiffness coefficients;

a mass, linear mass or volume density;

one or more internal friction parameters;

a maximum tension in the material layer.

Each connection position is preferentially defined with respect to a frame of reference like the inertial frame of reference, or with respect to the object used as frame of reference.

At step 403, the data processing system receives retraction system information inputs including a position of an entrance of the retraction system (for instance defined with respect to the frame of reference or the object), optionally a maximal length of flexible cable that might be retracted by the retraction system, a direction of retraction of the flexible cable through said entrance, and a retraction force, for instance defined by a spring constant for the retraction means of the retraction system, configured for retracting the flexible cable by acting notably on said second part of the flexible cable. The retraction means are for instance a spring of the retraction system, typically located within a housing of the retraction system and configured for applying a retraction force $F_R$ on the second part of the flexible cable in order to retract the flexible cable within the housing. The housing of the retraction system typically enables storage of an unused length of the flexible cable during motion of the object, for instance during relative motion of the first and second parts of the object, wherein the retraction system is preferentially fixed to the second part of the object. The entrance of the retraction system is preferentially an aperture of the housing of the retraction system that is configured for letting the flexible cable enter inside said housing during retraction of the cable, and exit said housing during a pulling of the flexible cable outside of said housing. More generally speaking, said entrance might be also defined as any point (called hereafter entrance point) within the housing that continuously intersects with the flexible cable during its motion (i.e. retraction and pulling out), at least one control point of the numerical model of the flexible cable having a relative motion compared to said entrance point. Preferentially, the length of the retracted part of the flexible cable may vary between a minimal length (for instance zero meters which would correspond to no retracted lengths of the flexible cable) and said maximal length (which is the maximal length of the retracted part that might be typically stored in the housing of the retraction system).

At step 404, the data processing system automatically creates a numerical model of the flexible cable from the object information inputs, cable information inputs and retraction system information inputs, wherein only an external part of the flexible cable is modelled while the retracted part is not modelled. The external part is notably automatically modelled by the data processing system as a sequence of control points distributed along a length of said external part of the flexible cable (i.e. the retracted part is not included in the numerical model created by the data processing system), wherein said external part is the part of the flexible cable comprised between the entrance position (or entrance point) and the extremity of the flexible cable located outside the retraction system, for instance said first extremity, wherein each of the control points is submitted to one or several forces representing an interaction of the control point with its environment, wherein each of the control points is preferentially submitted to the effects of inertia, wherein the length of the external part of the flexible cable varies in function of a retraction force applied by the retraction means for retracting the flexible cable within the housing, and optionally and additionally in function of said external force applied by the external part of the cable, while the number of control points along said length of the external part is kept fixed by the data processing system. The retraction force is for instance calculated by the processing unit from the spring constant and the length of retracted flexible cable, and applied then to at least one of the control points. Preferentially, the control points are regularly spaced along the length of the external part, for instance, the distance measured along the length of the cable and separating two neighboring control points, i.e. the flexible cable length between two neighboring control points, is identical for all control points, but may change with time depending on the retraction of the flexible cable. The independent motions allowed to the control points and the variable length of the external part of the flexible cable constitute the degrees of freedom of the external part of the flexible cable and are preferentially submitted to constraints on their value in order to avoid interpenetration with surrounding objects. The force applied to the control points is preferentially configured for modelling internal stress, and/or gravity, and/or contact forces and/or internal friction and/or friction with the environment and/or other physical phenomena.

At step 405, the data processing system automatically stores the numerical model of the flexible cable in a memory of the data processing system. According to the abovementioned numerical model of the flexible cable, the length of the external part is taken as an additional degree of freedom while the retracted part of the flexible cable and the interaction of said retracted part with the retraction system are not simulated. Consequently, the memory capacity for storing the numerical model and computing the latter is reduced, giving rise to enhanced and faster simulations.

At step 406, the data processing system, preferentially automatically, simulates a motion of the flexible cable that would occur during a motion of the object, for instance during motion of the first part of the object. For instance, it simulates the motion of the external part of the flexible cable during motion of the arm of the robot while the body of said robot is kept fixed. During the simulation, the number of control points of the external part of the flexible cable is kept fixed. During said simulation, the data processing system changes a position of at least one of said control points in function of the time while taking account of the force(s) applied to said control point and preferentially to each control point, while optionally and additionally taking account of the inertia on said control point. During said simulation, the data processing system can change the value of the variable length of the external part of the flexible cable in function of time, while taking account of the force applied to said variable length by the retraction means, and optionally of the force applied to said variable length by the external part of the flexible cable according to the forces that apply to said external part of the flexible cable and to the effects of inertia on said external part of the flexible cable. For the simulation itself, conventional known methods are used wherein the simulation of the motion of the control points distributed along the variable length of the external part of the flexible cable is divided in small time-steps, wherein at each time-step, a value of a position of at least one control point is recomputed by using the numerical model of the flexible cable, and wherein each new value obtained for each recomputed position of the control point is obtained by mutually counterbalancing the forces applied to the control point while preferentially ensuring no interpenetration with a surrounding object, resulting for instance in an automatic computation of a new value of the variable length of the external part.

As already explained, one essential feature of the present invention is to consider the flexible cable as having a variable length (i.e. the length of the external part of said flexible cable) and to apply known simulation techniques to this flexible cable of variable length. The number of control points outside the retraction system remains the same during all simulation time-steps, but the flexible cable length between each two successive control points varies in proportion of the length of the external part of the flexible cable that is currently outside the retraction system at the simulated time-step.

In order to realize the present invention, one or more of the processor 102, the memory 108, and the program running on the processor 102 receive the inputs via one or more of the local system bus 106, the adapter 112, the network 130, the server 140, the interface 114, the I/O bus 116, the disk controller 120, the storage 126, and so on. Receiving, as used herein, can include retrieving from storage 126, receiving from another device or process, receiving via an interaction with a user, or otherwise.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being illustrated or described herein. Instead, only so much of a data processing system as is unique to the present disclosure or necessary for an understanding of the present disclosure is illustrated and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims.

What is claimed is:

1. A method of simulating a flexible cable by a data processing system, wherein the flexible cable is configured for interacting with a retraction device of a retraction system, the method comprising the following steps:
    a) receiving object information inputs including a numerical model of an object;
    b) receiving cable information inputs including a length of the flexible cable, a connection position of a first part of the flexible cable to the object, and a connection position of a second part of the flexible cable to the retraction device;
    c) receiving retraction system information inputs including a position of an entrance of the retraction system with respect to the object, a direction of retraction of the flexible cable through the entrance, and a retraction force applied by the retraction device on the flexible cable to retract the flexible cable through the entrance;
    d) automatically creating, by the data processing system, a numerical model of the flexible cable from the object information inputs, cable information inputs, and retraction system information inputs, wherein the flexible cable is modeled as a sequence of control points distributed only along a length of an external part of the flexible cable, wherein the external part is a part of the flexible cable extending from the entrance of the retraction system in a direction opposed to the retraction direction to an extremity of the flexible cable, wherein each of the control points is submitted to a force representing an interaction of the control point with an environment thereof, wherein the length of the external part of the flexible cable varies in function of the retraction force applied by the retraction device on the flexible cable for retracting the flexible cable, and wherein a number of the control points along the length of the external part is fixed;
    e) automatically storing the numerical model of the flexible cable in a memory; and
    f) simulating a motion of the flexible cable that would occur during a movement of the object, wherein the number of the control points of the external part of the flexible cable remains fixed during a variation of the length of the external part.

2. The method according to claim 1, wherein the object comprises at least a first part and a second part in relative motion, and wherein the first part of the flexible cable is connected to the first part of the object and the second part of the flexible cable is connected to the second part of the object via the retraction device.

3. The method according to claim 1, wherein the first part of the flexible cable is a first extremity of the flexible cable distally from the retraction system and the second part of the flexible cable is a part connected to the retraction device of the retraction system.

4. The method according to claim 1, wherein the numerical model of the external part of the flexible cable comprises a first control point and a last control point, wherein the first control point is located at a most distant extremity of the flexible cable with regard to the retraction system and the last control point is located at the entrance of the retraction system, wherein the last control point remains stationary with respect to the retraction system during a variation of the length of the external part of the flexible cable.

5. The method according to claim 4, which comprises automatically recalculating with the data processing system the position of any control point located between the last control point and the first control point in order to satisfy a user-defined constraint related to a distribution of the control points along the length of the external part or in order to keep the flexible cable length between each pair of directly successive control points in a fixed proportion of the length of the external part of the flexible cable during the variation of the length of the external part.

6. A data processing system for performing a simulation of a flexible cable, wherein the flexible cable is configured for interacting with a retraction device of a retraction system, the data processing system comprising:
    a processor and an accessible memory, and wherein the data processing system is configured to:
    a) receive object information inputs including a numerical model of an object;
    b) receive cable information inputs including a length of a flexible cable, a connection position of a first part of the flexible cable to the object, and a connection position of a second part of the flexible cable to the retraction device;
    c) receive retraction system information inputs including a position of an entrance of the retraction system with respect to the object, a direction of a retraction of the flexible cable through the entrance, and a retraction force applied by the retraction device on the flexible cable;
    d) automatically create a numerical model of the flexible cable from the object information inputs, the cable information inputs, and the retraction system information inputs, wherein the flexible cable is modelled as a sequence of control points distributed only along a length of an external part of the flexible cable, wherein the external part is a part of the flexible cable extending from the entrance of the retraction system in a direction opposed to the retraction direction to a distal extremity of the flexible cable, wherein each of the control points is subject to a force representing an interaction of the control point with an environment thereof, wherein the length of the external part of the flexible cable varies as a function of the retraction force applied by the retraction device on the flexible cable for retracting the flexible cable, and wherein a number of the control points along the length of the external part is fixed;
    e) automatically store the numerical model of the flexible cable in a memory; and
    f) simulate a motion of the flexible cable that would occur during a movement of the object, wherein the number of the control points of the external part of the flexible cable remains fixed during a variation of the length of the external part of the flexible cable.

7. The data processing system according to claim 6, wherein the object comprises at least a first part and a second part in relative motion, and wherein the first part of the flexible cable is connected to the first part of the object and the second part of the flexible cable is connected to the second part of the object via the retraction device.

8. The data processing system according to claim 6, wherein the first part of the flexible cable is a first extremity of the flexible cable distally from the retraction system and the second part of the flexible cable is a part connected to the retraction device of the retraction system.

9. The data processing system according to claim 6, wherein the numerical model of the external part of the flexible cable comprises a first control point and a last control point, wherein the first control point is located at a most distant extremity of the flexible cable with regard to the retraction system and the last control point is located at the entrance of the retraction system, wherein the last control point remains stationary with respect to the retraction system during a variation of the length of the external part of the flexible cable.

10. The data processing system of claim 9, wherein the data processing system is configured for automatically recalculating the position of any control point located between the last control point and the first control point in order to satisfy a user-defined constraint related to a distribution of the control points along the length of the external part or in order to keep the flexible cable length between each pair of directly successive control points in a fixed proportion of the length of the external part of the flexible cable during the variation of the length of the external part.

11. A non-transitory computer-readable medium encoded with executable instructions which, when executed, cause one or more data processing systems to:
 a) receive object information inputs including a numerical model of an object;
 b) receive cable information inputs including a length of a flexible cable, a connection position of a first part of the flexible cable to the object, and a connection position of a second part of the flexible cable to retraction device of a retraction system configured for interacting with the flexible cable;
 c) receive retraction system information inputs including a position of an entrance of a retraction system coupled to the flexible cable, a direction of retraction of the flexible cable through the entrance, and a retraction force applied by the retraction device on the flexible cable;
 d) automatically create a numerical model of the flexible cable from the object information inputs, cable information inputs and retraction system information inputs, wherein the flexible cable is modelled as a sequence of control points distributed only along a length of an external part of the flexible cable, wherein the external part is a part of the flexible cable extending from the entrance of the retraction system in a direction opposed to the retraction direction towards and to an extremity of the flexible cable, wherein each of the control points is subject to a force representing an interaction of the control point with an environment thereof, wherein the length of the external part of the flexible cable varies as a function of the retraction force applied by the retraction device on the flexible cable for retracting the flexible cable, and wherein a number of control points along the length of the external part is fixed;
 e) automatically store the numerical model of the flexible cable in a memory; and
 f) simulate a motion of the flexible cable that would occur during a movement of the object, wherein the number of the control points of the external part of the flexible cable remains fixed during the simulation, while the length of the external part may vary.

12. The non-transitory computer-readable medium according to claim 11, wherein the object comprises at least a first part and a second part in relative motion, and wherein the first part of the flexible cable is connected to the first part of the object and the second part of the flexible cable is connected to the second part of the object via the retraction device.

13. The non-transitory computer-readable medium according to claim 11, wherein the first part of the flexible cable is a first extremity of the flexible cable distally from the retraction system and the second part of the flexible cable is a part connected to the retraction device of the retraction system.

14. The non-transitory computer-readable medium according to claim 11, wherein the numerical model of the external part of the flexible cable comprises a first control point and a last control point, wherein the first control point is located at a most distant extremity of the flexible cable with regard to the retraction system and the last control point is located at the entrance of the retraction system, wherein the last control point remains stationary with respect to the retraction system during a variation of the length of the external part of the flexible cable.

15. The non-transitory computer-readable medium according to claim 14, wherein the executable instructions are configured to cause the one or more data processing systems to automatically recalculate the position of any control point located between the last control point and the first control point in order to satisfy a user-defined constraint related to a distribution of the control points along the length of the external part or in order to keep the flexible cable length between each pair of directly successive control points in a fixed proportion of the length of the external part of the flexible cable during a variation of the length of the external part.

* * * * *